Sept. 24, 1940.   H. E. CLARKE   2,215,496
CLUTCH CONTROL DEVICE
Filed Sept. 15, 1938   3 Sheets-Sheet 3
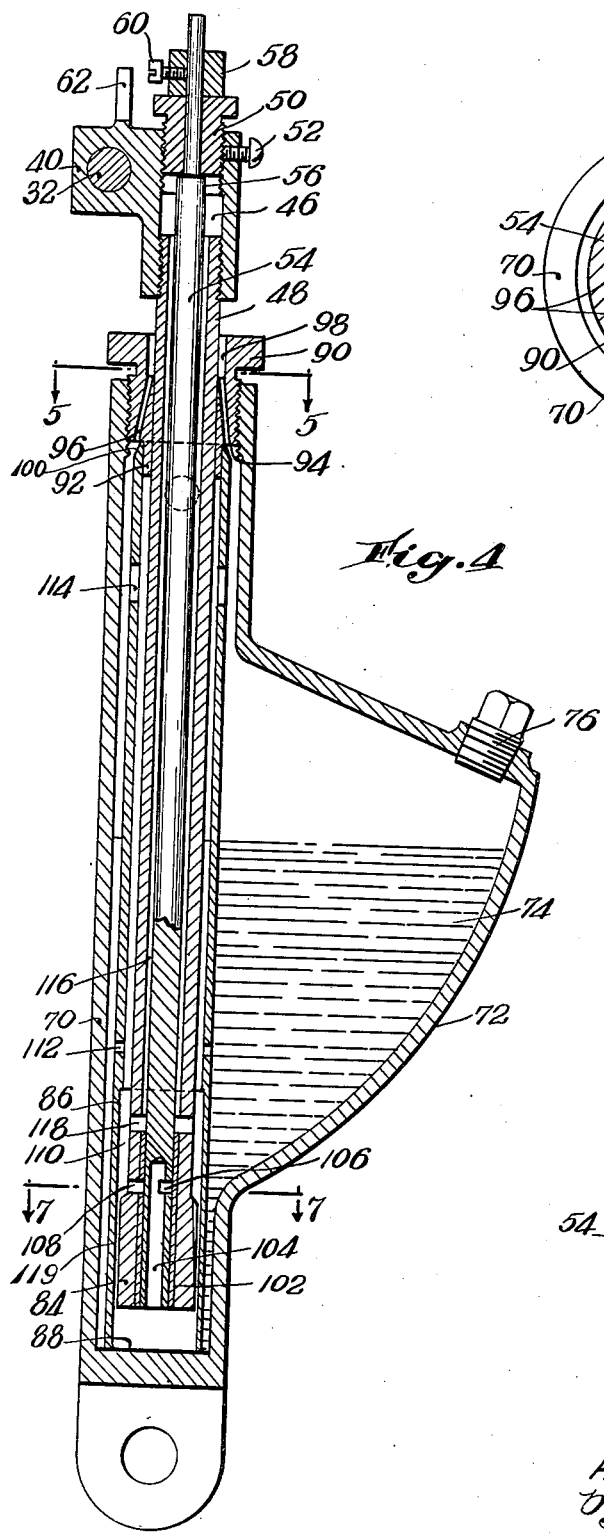
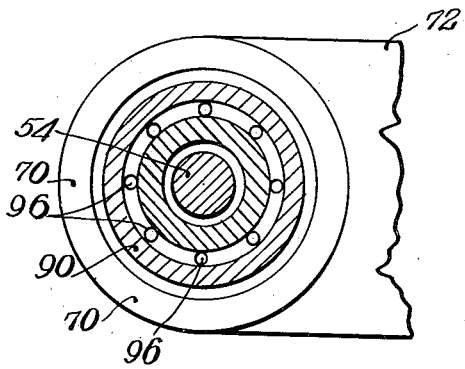
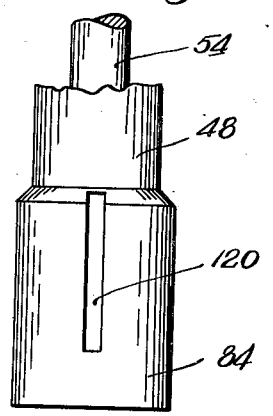
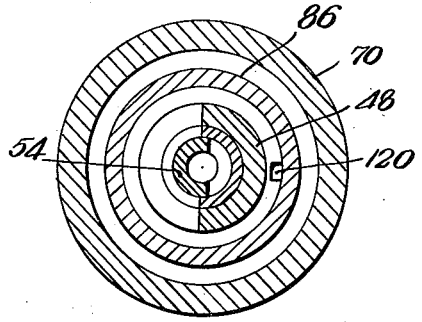
Inventor
HAROLD E. CLARKE
By Thomson & Thomson
His Attys.

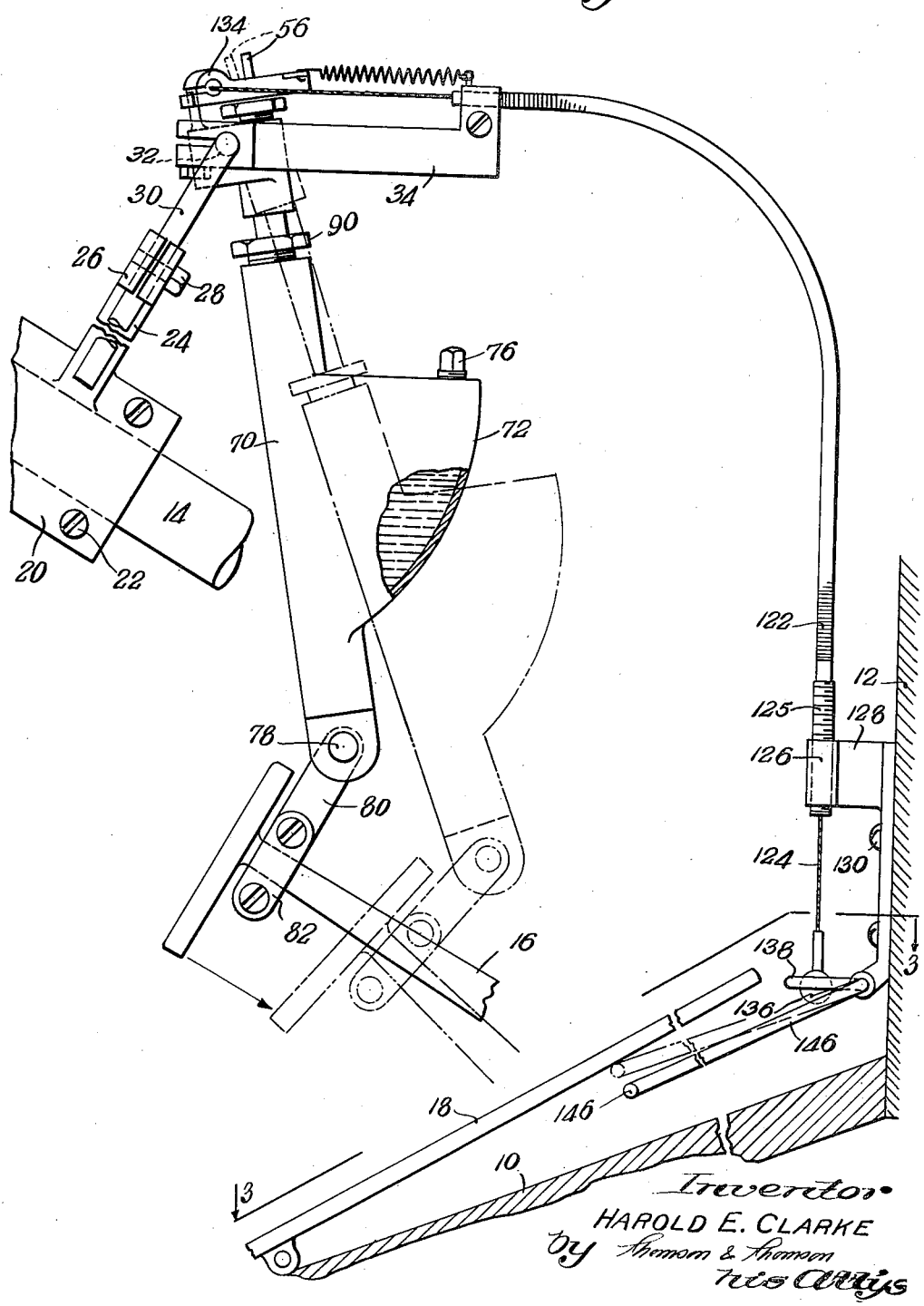

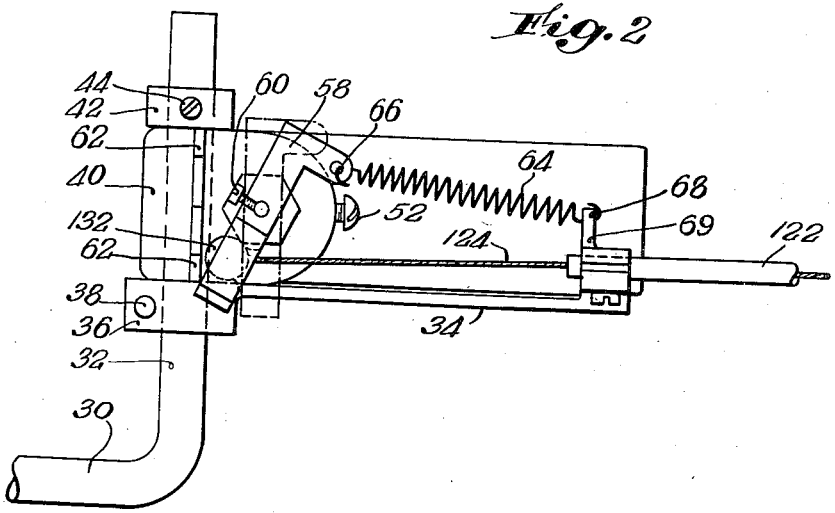
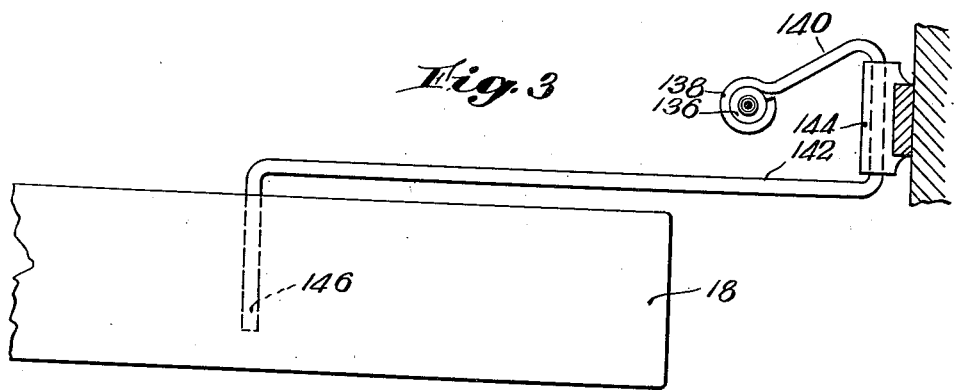

Patented Sept. 24, 1940

2,215,496

UNITED STATES PATENT OFFICE 2,215,496

CLUTCH CONTROL DEVICE

Harold E. Clarke, West Somerville, Mass.

Application September 15, 1938, Serial No. 230,047

6 Claims. (Cl. 192—.01)

This invention relates to improvements in a clutch control device to automatically regulate the engagement of a motor vehicle clutch.

The disclosure in this application is an improvement over my prior application for Clutch control means, Serial No. 23,428, filed May 25, 1935, and my application for Clutch control device, Serial No. 202,266, filed April 15, 1938.

It is an object of my invention to provide a clutch control device which may readily be installed in the driver's compartment of any standard make car by mounting the dash-pot cylinder on the clutch pedal, mounting the dash-pot plunger on the steering post and mounting a control for the dash-pot valve adjacent to and for operation by the accelerator pedal.

It is a further object of my invention to provide an improved control of the dash-pot valve which results in a smoother clutch engagement under all conditions of driving in which the valve is controlled by the combined effects of the movement of the accelerator pedal and the relative movement of the plunger with respect to the cylinder.

In my improved device, a flexible cable and conduit provides means for transmitting the movement of the accelerator pedal to the valve and the dash-pot plunger, on which the valve control lever is mounted, is pivotally mounted with respect to one end of the cable conduit so that as the plunger moves into the cylinder during the return of the clutch pedal the cable is released tending to permit closing of the valve and opposing the action of the accelerator which tends to open the valve as the accelerator pedal is depressed thereby resulting in a smooth control of the clutch engagement.

Further objects and advantages of my improvements will be more readily apparent from the following description of my preferred embodiment as disclosed in the attached drawings, in which:

Fig. 1 is an elevation partially in section showing the assembly of the hydraulic dash-pot clutch control device and the mounting thereof with respect to the steering post and the clutch pedal;

Fig. 2 is an enlarged detail plan view of the upper end of the control unit showing the valve operating arm and the Bowden wire connection thereto;

Fig. 3 is a sectional view taken on the plane indicated 3—3 in Fig. 1 showing the association of the accelerator pedal with respect to the arm which controls the valve thru the Bowden wire connection.

Fig. 4 is a vertical section taken thru the piston, cylinder and control valve of the dash-pot device;

Fig. 5 is an enlarged detail section on the plane indicated 5—5 in Fig. 4.

Fig. 6 is an enlarged detail elevation of the head of the plunger or piston; and Fig. 7 is an enlarged section taken on the plane indicated 7—7 in Fig. 4.

The dash-pot clutch control unit is designed to be installed on any standard make of car in the driver's compartment in front of the dash-board instead of under the hood as in my prior application, Serial No. 202,266, and the usual parts of the vehicle are fragmentarily shown in Fig. 1, namely, the floor board 10, the dash 12, the steering post 14, the clutch pedal 16 and the accelerator pedal 18.

A bracket 20 is formed to be mounted on the steering post with the bolts 22 and includes an extension arm 24 having a clevis 26 to receive the adjustable supporting rod 30 fastened by bolt 28 on the clevis 26. The rod 30 is L shaped as shown in Fig. 2 and the arm 32 should be positioned substantially horizontally as shown.

A bracket 34 is specially designed to be fixedly mounted in a horizontal position on the arm 32 of rod 30 and is secured in position by the offset clevis 36 and bolt 38. A bracket 40 is swivelled on the arm 32 of rod 30 and is retained against lateral movement by the collar 42 which is fastened by screw 44.

The bracket 40 has an internally threaded bore 46 into the lower end of which the tubular plunger 48 is screwed. An adjusting nut 50 is screwed into the upper end of the bore and is secured in adjusted position by set screw 52. The valve rod 54 is received in the tubular plunger and has a reduced stem 56 extending thru the adjusting nut 50. A valve operating arm 58 is fastened by set screw 60 to the stem 56 above the adjusting nut whereby rotation of the adjusting nut will raise or lower the valve rod 54 with respect to the plunger 48 and movement of arm 58 will rotate the valve rod with respect to the plunger. The bracket 40 is formed with stops 62 to limit the movement of arm 58. The arm 58 is normally urged to move towards closed position of the valve by a tension spring 64 fastened at 66 to one end of the arm 58 and at 68 to an offset extension 69 of the bracket 34.

The casing 70 for the dash-pot cylinder is a casting having an offset portion 72 forming a fluid reservoir 74 which may be filled thru an opening normally closed by the plug 76. The lower end of the casing 70 receives a pivot pin 78 and is connected by the link 80 to a bracket 82 which is fixed to the clutch pedal 16. The plunger 48 has a piston head 84 slidable in a brass sleeve 86. The sleeve or cylinder 86 abuts at its lower end against the bottom wall 88 of the reservoir 74 of casing 70 and is held securely in position by a nut 90 threaded into the casing 70 and provided with a lip 92 fitting within and centering the upper end of the sleeve 86 which abuts against the shoulder 94 of the nut. The nut 90 has oil return passages 96 leading from an oil collecting pocket 98. The upper end of the sleeve has a chamfer 100 to prevent interference with the passages 96 and to allow the oil to drain into the reservoir.

The valve construction shown in Figs. 4 and 7 is similar to that in my prior application Serial No. 202,266. The valve rod 54 at its lower end is fitted snugly in a bushing 102 which is press fitted in the plunger 48. The valve rod has a centrally bored passage 104 communicating with a valve notch 106. The notch 106 cooperates with a notch 108 in the wall of plunger 48 to adjustably control the escape of fluid from the underside of piston 84. The fluid is free to pass from the space 110 between the plunger 48 and sleeve 86 thru openings 112 and 114 into the reservoir 74. Any fluid which may enter the space 116 around the valve rod 54 is free to pass thru openings 118 into the space 110 and thence to the reservoir.

A short distance below the openings 112, the interior diameter of the sleeve 86 may be slightly enlarged as shown at 119 and the piston head 84 may have a vertical tapered notch 120 which leads from the upper end of the head and terminates a short distance from the lower end thereof. Immediately after the notch 120 enters the enlarged portion of sleeve 86 fluid is able to escape from the compression side of the piston through the bypass formed by notch 120.

The valve rod 54 is operated by movement of the accelerator through a Bowden wire connection comprising the flexible conduit 122 and cable 124. The conduit is fixed at one end to the bracket 34 and at the other end is adjustably connected by the screw 125 to post 126 of a bracket 128 which is fastened to the dash 12 by bolts 130. The cable has a ball 132 at one end adapted to slip in an eye 134 at one end of lever arm 58 and the cable has a ball 136 at its other end adapted to slip in an eye 138 in one arm 140 of lever 142 which is pivoted in a bearing 144 of bracket 128. The pivoted lever 142 has an arm 146 adapted to extend beneath the accelerator pedal.

In Fig. 1 the clutch pedal and dash-pot device are shown in full lines in normal inoperative positions with the clutch in full engagement. Depression of the clutch pedal to disengage the clutch brings the parts to the positions shown in dotted lines. The dash-pot plunger 48 swings about the fixed arm 32 and since the bracket 34 is fixed and the cable is coupled to the eye 134 above the pivot the cable is pulled through the conduit thereby moving the arm 146 into contact with the accelerator pedal 18. If the accelerator pedal is depressed the cable will be moved in a direction to open the dash-pot control valve but as the clutch pedal comes back and plunger 48 swings back towards its full line position the slack is returned to the cable and the valve will tend to close unless the accelerator is depressed still further.

The effective action of the dash-pot resistance is only required during a very short portion of the full movement of the clutch pedal and of the plunger with respect to the cylinder. The pedal should be permitted to return at a rapid rate of movement until the clutch just starts to engage and this is permitted by the flow of the oil from the compression side of the cylinder through the ports 112. Also after the clutch is fully engaged the clutch pedal should complete its full return rather rapidly and this movement is permitted by the bypass of the oil through the notch 120 in the piston head and around the piston head as it enters the enlarged portion of the sleeve. The effective resistance as the clutch is engaging should be variable to obtain a smooth engagement without slipping of the clutch or stalling of the engine under all conditions of engine load and speed.

In general the resistance is greatest with a closed throttle and is decreased as the throttle is opened by depression of the accelerator pedal. Thus in my arrangement the depression of the accelerator pedal tends to open the valve passage through the piston head. In addition an important feature of my present improvement resides in the provision for increasing the resistance from the point at which the clutch just starts to engage up to the point at which the clutch is in full engagement. As the plunger swings with respect to its pivot during the return of the clutch pedal the clevis 134 tends to move towards the fixed end of the cable conduit thereby tending to release the cable and permit movement of the valve rod in a direction to close the bypass through the piston head.

A very fine adjustment of the valve port may be obtained as it may be adjusted by turning the nut 50. The amount of the compensating action may be adjusted by turning the screw 125 thereby modifying the normal position of arm 146 with respect to the accelerator. The support member 30 may be raised or lowered to make the resisting action of the dash-pot correspond with the engaging action of the clutch.

The provision of the stops 62 limits the movement of the arm 58 in either direction. Normally the arm is maintained in position against one stop 62 by the spring 64 and the valve means controlled by the arm 58 will be in closed position. The other stop tends to limit the maximum opening of the valve means as the arm 58 is moved in counter-clockwise direction through depression of the accelerator pedal. Thereafter as the clutch is permitted to return towards engagement, the swinging of the plunger 48 tends to cause closing of the valve means, and the extent of this movement is definitely determined in relation to the movement of the clutch as it approaches engagement. The movement of the clutch as it is about to engage is therefore definitely determined independent of the operator. It is possible for the operator, by pressing the accelerator pedal gradually, to somewhat slow down the engaging movement of the clutch, but the operator can not cause the clutch to come in so fast that stalling of the engine or unnecessary wear of the clutch plates might occur.

I claim:

1. In a dash-pot control for a motor vehicle clutch a dash-pot cylinder pivotally mounted on the clutch pedal, a dash-pot plunger pivotally mounted on the steering post, a dash-pot control valve mounted in the plunger head and means operable by the accelerator pedal for moving said valve.

2. A motor vehicle clutch control device comprising liquid containing dash-pot means including a cylinder and a plunger cooperating therewith, said dash-pot means presenting a variable resistance for automatically controlling the engagement of the clutch, valve means associated with said plunger to vary the action of the dash-pot means and means to control said valve means by the combined effect of the movement of the accelerator and the relative movement of the plunger with respect to the cylinder.

3. A motor vehicle clutch control device comprising liquid containing dash-pot means including a cylinder and a plunger cooperating therewith, said dash-pot means presenting a variable resistance for automatically controlling the engagement of the clutch, a single valve means to vary the action of the dash-pot means and means to control said valve means tending to reduce the resistance of the dash-pot means as the accelerator pedal is depressed and tending to increase the resistance of the dash-pot means as the plunger moves into the cylinder for permitting engagement of the clutch.

4. A motor vehicle clutch control device comprising dash-pot means including a cylinder and a plunger cooperating therewith, said dash-pot means presenting a variable resistance for automatically controlling the engagement of the clutch, said cylinder and piston being pivotally mounted with respect to the clutch pedal and the steering post whereby the plunger is drawn out of the cylinder as the clutch pedal is depressed and is forced into the cylinder as the clutch pedal returns, a rotatable valve rod mounted in the plunger, a lever arm fixed to the outer end of said valve rod, a lever pivotally mounted adjacent the accelerator pedal for operation thereby and flexible cable and conduit means for transmitting the movement of said accelerator operated lever to said valve rod lever arm, said plunger being pivotally mounted to move the valve rod lever arm with respect to the cable conduit and thus modify the action of the accelerator pedal upon the valve rod during the movement of the clutch pedal, cylinder and plunger.

5. In a mechanism for controlling the engagement of a motor vehicle clutch, dash pot means including a cylinder and a plunger cooperating therewith, means for producing relative movement between said cylinder and plunger responsive to the movement of the clutch whereby said dash pot means acts to retard the engagement of the clutch, valve means variably controlling the retarding effect of the dash pot means, means tending to open said valve means by depression of the accelerator, means for limiting the maximum opening of said valve means, and means tending to move said valve means towards closed position responsive to the relative movement between said cylinder and plunger as the clutch approaches engagement.

6. In a mechanism for controlling the engagement of a motor vehicle clutch, dash pot means including a cylinder and a plunger cooperating therewith, means for producing relative movement between said cylinder and plunger responsive to movement of the clutch whereby said dash pot means acts to retard the engagement of the clutch, a valve member associated with said plunger for variably controlling the retarding effect of the dash pot means, resilient means normally urging said valve member towards closed position, accelerator operated means tending to move said valve member towards open position, means for limiting maximum opening movement of said valve member, and means tending to oppose the action of the accelerator operated means and to cause closing of the valve member as the relative movement between the cylinder and plunger approaches a position corresponding to clutch engagement.

HAROLD E. CLARKE.